US007004702B2

(12) United States Patent
Van Der Heijden (10) Patent No.: US 7,004,702 B2
(45) Date of Patent: Feb. 28, 2006

(54) SYSTEM FOR CONNECTING ELEMENTS (76) Inventor: Franciscus Antonius Maria Van Der Heijden, Grotenhout 2, B-2275 Lille (BE)

( * ) Notice: Subject to any disclaimer, the term of this patent is extended or adjusted under 35 U.S.C. 154(b) by 0 days.

(21) Appl. No.: 10/181,201

(22) PCT Filed: Jan. 17, 2001

(86) PCT No.: PCT/EP01/00616

§ 371 (c)(1),
(2), (4) Date: May 2, 2003

(87) PCT Pub. No.: WO01/53622

PCT Pub. Date: Jul. 26, 2001

(65) Prior Publication Data

US 2003/0180123 A1    Sep. 25, 2003

(51) Int. Cl.
*F16B 35/02* (2006.01)
*F16B 37/00* (2006.01)
*F16B 37/10* (2006.01)
*F16B 37/12* (2006.01)

(52) U.S. Cl. ..................................... 411/438
(58) Field of Classification Search ........ 411/508–510, 411/451.1, 436, 437, 182, 427, 913, 438, 411/512, 527, 520, 521; 24/453, 297, 458
See application file for complete search history.

(56) References Cited

U.S. PATENT DOCUMENTS

| 582,525 A | * | 5/1897 | Gare et al. ................. 411/438 |
| 1,489,809 A | * | 4/1924 | Austin ........................ 174/196 |
| 1,933,007 A | * | 10/1933 | Dieter ......................... 411/427 |
| 2,149,719 A | * | 3/1939 | Arnest ........................ 220/3.4 |
| 2,210,353 A | * | 8/1940 | Barnes ........................ 228/145 |
| 2,354,810 A | * | 8/1944 | Haas et al. .................. 411/438 |
| 2,358,707 A | * | 9/1944 | Haas ............................ 470/18 |
| 2,407,879 A | * | 9/1946 | Haas ........................... 411/438 |
| 2,439,685 A | * | 4/1948 | Findley ....................... 411/438 |
| 2,439,687 A | * | 4/1948 | Findley ....................... 411/438 |
| 2,581,399 A | * | 1/1952 | Forster ....................... 411/438 |
| 2,582,580 A | * | 1/1952 | Bedford, Jr. ................ 411/520 |
| 2,672,070 A | * | 3/1954 | Forster ....................... 411/438 |
| 2,766,799 A | * | 10/1956 | Poupitch .................... 411/134 |
| 3,115,804 A | * | 12/1963 | Johnson ..................... 411/338 |
| 3,160,967 A | * | 12/1964 | Nichols ....................... 37/446 |

(Continued)

FOREIGN PATENT DOCUMENTS

WO    WO 98/48126    * 10/1998

*Primary Examiner*—Robert J. Sandy
*Assistant Examiner*—Jeffrey A. Sharp
(74) *Attorney, Agent, or Firm*—Gary M. Hartman; Domenica N.S. Hartman; Hartman & Hartman (57) ABSTRACT

A fastener system for connecting and releasing two elements. The system comprises a rod-shaped product with a male part and a female part, in which the male part is sized to be receivable in the female part. Either the male or female part is provided with a screw thread and the other is provided with at least one tooth such that, when the male and female parts are assembled, the tooth is engaged with the screw thread. The part equipped with the tooth comprises a strip extending in the longitudinal direction thereof, so that when the male part is pressed into the female part, the tooth is elastically distorted axially onto the screw thread, and the tooth shape and the screw thread prevent axial movement in the opposite direction.

1 Claim, 7 Drawing Sheets

U.S. PATENT DOCUMENTS

| | | | |
|---|---|---|---|
| 3,466,966 A * | 9/1969 | Brown | 411/510 |
| 3,810,279 A * | 5/1974 | Swick et al. | 411/509 |
| 3,910,156 A * | 10/1975 | Soltysik | 411/61 |
| 4,712,955 A * | 12/1987 | Reece et al. | 411/17 |
| 4,728,236 A * | 3/1988 | Kraus | 411/437 |
| 4,850,778 A * | 7/1989 | Clough et al. | 411/433 |
| 4,902,182 A * | 2/1990 | Lewis | 411/510 |
| 4,999,019 A * | 3/1991 | Kraus | 411/512 |
| 5,039,267 A * | 8/1991 | Wollar | 411/508 |
| 5,098,242 A * | 3/1992 | Schaty | 411/437 |
| 5,101,213 A * | 3/1992 | Harada et al. | 343/715 |
| 5,197,840 A * | 3/1993 | Peek | 411/433 |
| 5,291,639 A * | 3/1994 | Baum et al. | 24/297 |
| 5,451,124 A * | 9/1995 | Meigs | 411/436 |
| 5,660,513 A * | 8/1997 | Shibanushi | 411/433 |
| 5,816,762 A * | 10/1998 | Miura et al. | 411/433 |
| 5,868,537 A * | 2/1999 | Latal et al. | 411/418 |
| 5,961,266 A * | 10/1999 | Tseng | 411/383 |
| 6,070,836 A * | 6/2000 | Battie et al. | 248/68.1 |
| 6,152,667 A * | 11/2000 | LeVey | 411/521 |
| 6,282,859 B1 * | 9/2001 | Van Der Heijden | 52/585.1 |
| 6,345,420 B1 * | 2/2002 | Nabeshima | 24/297 |
| 6,505,386 B1 * | 1/2003 | Allie | 24/458 |
| 6,517,543 B1 * | 2/2003 | Berrevoets et al. | 606/73 |
| 6,598,836 B1 * | 7/2003 | Leon | 248/74.1 |

\* cited by examiner

SYSTEM FOR CONNECTING ELEMENTS

CROSS REFERENCE TO RELATED APPLICATIONS

This application claims the benefit of International Application No. PCT/EP01/00616, filed Jan. 17, 2001.

BACKGROUND OF THE INVENTION

The present invention relates to a system for connecting releasingly two elements with each other, comprising a male part being integral or connectable with a first element, and a female part being integral or connectable with the second element, wherein one of the parts, the male or female one, has a round section and is provided with a screw thread and the other part is provided with at least one protruding tooth, being engaged into the screw thread with the male and female parts being inserted into each other.

Such a connecting system is generally known. In practice, a metal part is used on the one hand, and on the other hand, a synthetic part having such a shape that the synthetic part or at least parts thereof can be elastically or plastically distorted. So-called nail plugs are well known, being made of a synthetic sheath-shaped part in which inwardly protruding edges are formed, and a nail or dowel part partially provided with a screw thread. After sticking the nail part into the sheath, the nail part may be unscrewed again. However, the sheath is not to be used again since it has suffered from permanent damages. When sticking the nail part, quite strong forces are applied.

BRIEF SUMMARY OF THE INVENTION

The aim of the present invention is to provide a system of the type as described in the opening paragraph, so overcoming the above-mentioned disadvantages.

This object is reached according to the invention in that the longitudinal direction of the connecting element comprises a rod on which protruding teeth are provided, in such a way that, when the male and female parts are being pressed into each other, the teeth can be pressed through an elastic distortion on the screw thread and that the tooth shape and the screw thread are chosen in such a way that an axial movement in the opposite direction is prevented.

Using the teeth makes it possible to make the female and the male parts engaged into one another so that at least one tooth is always active in the connection. The mutual distance between the teeth is generally chosen so that, for example, when axially pressed together for every ⅓ of the pitch, at least one tooth is active. When distorting elastically the teeth upon the connection, the teeth are not damaged and can be used repeatedly.

BRIEF DESCRIPTION OF THE DRAWINGS

Other features and advantages of the invention will become evident from the following description referring to the accompanying drawings in which.

DETAILED DESCRIPTION OF THE INVENTION

Figures 1, 2, 3:
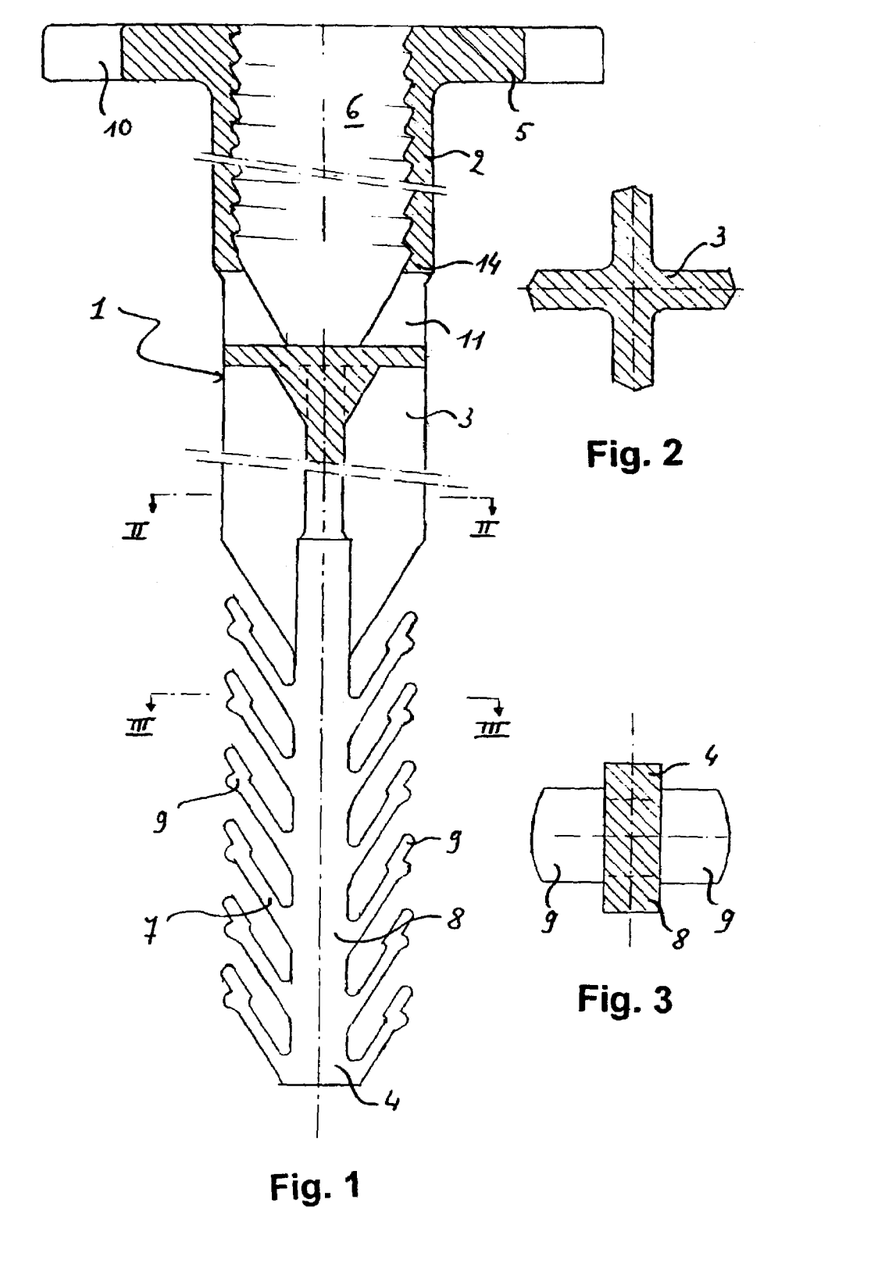
FIG. 1 is a side view, partially in section of a connecting element according to the invention.
FIG. 2 is a section along line II—II in FIG. 1.
FIG. 3 is a section along line III—III in FIG. 1.

FIG. 1 shows a connecting element 1 according to the invention, comprising a female part 2, a rod 3, the length of which may vary, and a male part 4.

The female part 2 comprises a cylindrical portion 14 that is provided, near one end, with a ring-shaped flange 5. The cylindrical portion 14 is provided with a bore 6 being inwardly provided with a screw thread. In the illustrated embodiment, the bore 6 is provided with an appropriate screw thread with a determined pitch. The screw thread is preferably of a type being also convenient for use in combination with parts having a standard screw thread. The other end of the cylindrical portion 14 is conical and forms thereby a passage and a connection towards the rod 3.

In the embodiment shown in FIG. 2, the rod 3 has a cross-shaped section, but the rod 3 may obviously have different shapes. The most important is that the rod 3 should form a spacer between the male part 4 and the female part 2 and should therefore be sufficiently rigid in order to be able to transfer the desired forces.

The other end of the rod 3 is connected with the male part 4 which, in the illustrated embodiment, is made of a rod 8 provided with a number of teeth 9 disposed along its axial length so as to define multiple levels of teeth 9 in the axial direction of the rod 8. The teeth 9 are preferably specially formed with free ends extending in the direction of the female part 2.

In substance the teeth 9 can be shaped as truncated cone-shaped envelopes which each time extend over the whole periphery of the rod 8. The teeth are however, so to speak, preferably made with cone-shaped envelopes whereby, seen in the periphery direction, a portion of the truncated cone-shaped envelopes is repeatedly cut off at regular distances or, as shown in FIG. 3, only two oppositely-disposed teeth remain within each level along the length of rod 8.

Figure 4:
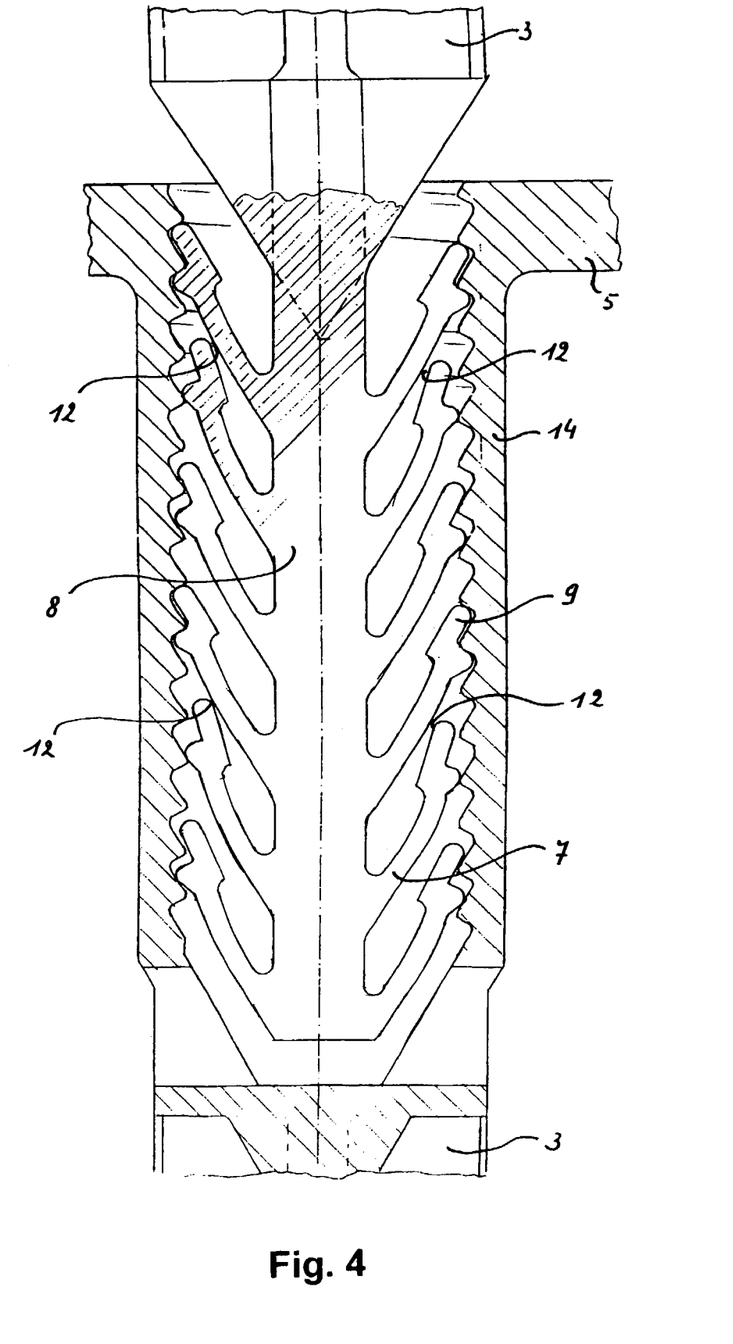
FIG. 4 is a section of a connection by means of the connecting element according to FIG. 1.

In order to be able to press the male part 4 with a small force onto the appropriate screw thread in the female part 2, the teeth 9 are elastically distorted and should therefore have a low wall thickness 7, which is at the cost of the authorized connecting force. When loaded, the teeth 9 are prone to bend out, but due to the tooth shape shown in FIG. 4, bending out is recovered at 12 by the lower tooth whereby the authorised bending force becomes approximately four times greater. In order to prevent the rod 8 from bending, if a tooth 9 of a given level is active, the opposite tooth 9 is also active to provide at least two active teeth 9 within that level as shown in FIG. 4.

Figure 5:
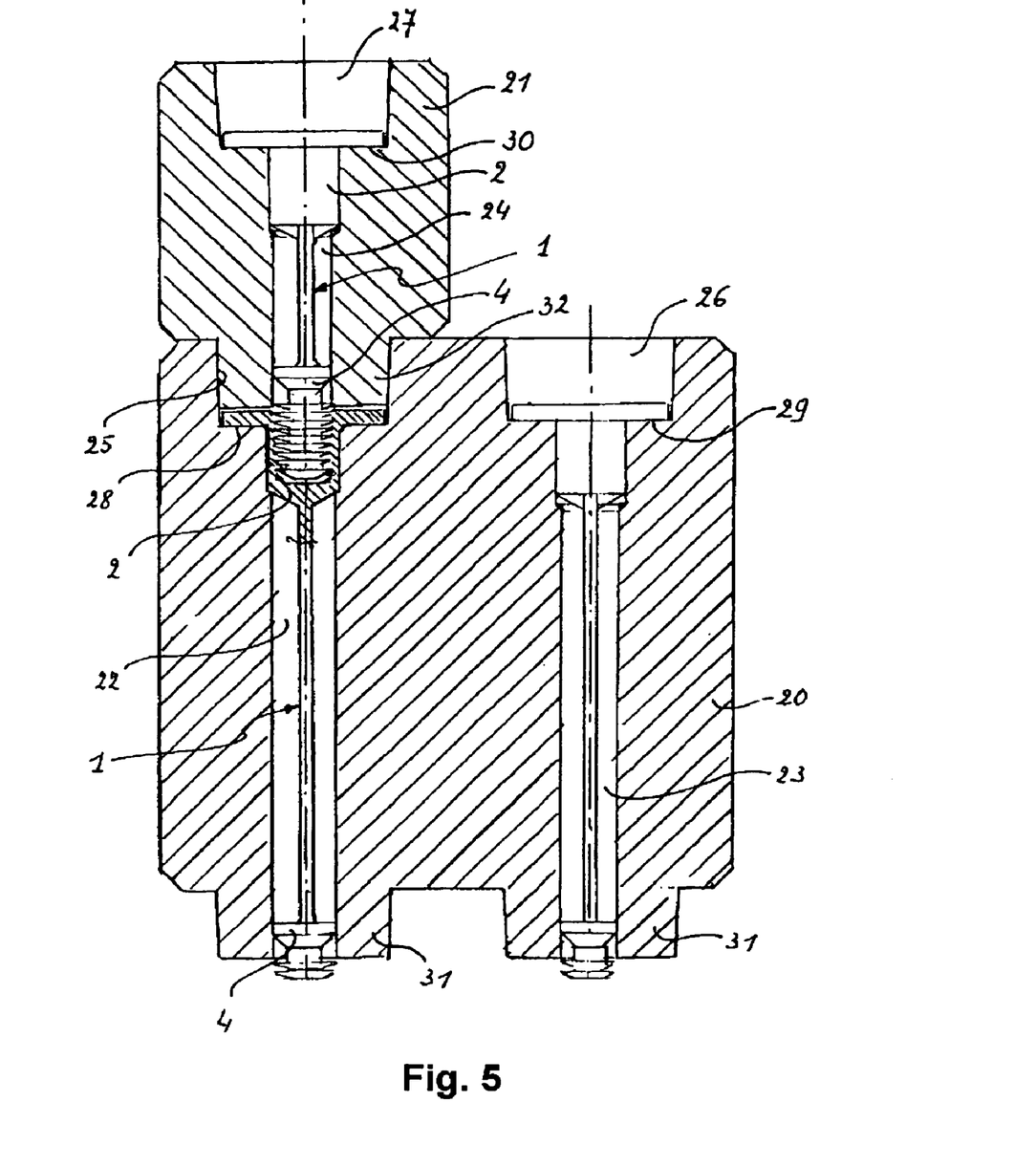
FIG. 5 is a diagrammatic section showing two parts connected through an element according to FIG. 1.

FIG. 5 shows how by means of connecting elements 1, in which the male part 4 has truncated cone-shaped envelopes, different parts of a construction, for instance building elements as disclosed in the Patent Application WO-A-98 48

126, can be connected together. FIG. 5 schematically illustrates two parts 20 and 21, wherein part 20 is provided with at least two continuous bores 22 and 23 and part 21 is provided with a continuous bore 24. The bores 22, 23 and 24, near the end illustrated in FIG. 2 as above, are provided with a part 25, 26, and 27 with a larger diameter in which the flange 5 of a connecting element 1 can be incorporated that can thereby lie against thus formed edges 28, 29 and 30. The diameter of bores 22, 23 and 24 is mainly equal to the inner diameter of the female part 2 so that it can be slid inside with a small spacing.

In order to connect part 21 with part 20, it should be proceeded as follows. Suppose that a connecting element 1 is mounted in the bore 22 wherein the other end of the male part 4 is anchored in any way, either on a (not shown) construction part or on a foundation.

The part 21 is put on the part 20 in such a way that the bore 24 lies in the extension of the bore 22. In the illustrated embodiment, parts 21 and 22 are provided with projections 31 and 32 which fit into the parts 25, 26 and 27 with a larger diameter. This facilitates the positioning of parts 21 and 22 relative to one another, but is not necessary.

After the part 21 is thus mounted on part 20, a connecting element 1 is pushed through the bore 24 until the male part 4 thereof lies on the female part 2 of the connecting element 1 belonging to the part 20.

The male part 4 is subsequently slightly pressed into the female part 2, which leads to a temporary elastic distortion of the teeth 9, until the flange 5 of the connecting element 1 belonging to the part 21 lies against the edge 30. Applying the necessary light force is done by hand.

FIG. 4 shows that, when using a number of independent teeth 9 on the male part 4, it is possible to position the connecting element 1 very accurately in axial direction. When for example two teeth 9 per level are provided as shown in FIGS. 3 and 4, it is possible to shift the anchorage at 6 levels each time over a distance with a third pitch when further pushing the one connecting element in the other connecting element. If desired, the connection can be further enhanced by screwing the male part 4 further inside the female part 2.

It is possible at any time to release the connection between two connecting elements 1. This can be done by unscrewing, as in a common bolt and nut connection. The flange 5 may be therefor provided with a groove for a screw driver, or as illustrated in FIG. 1, with two openings 10 allowing to shift the element with the help of a special tool or with a screw driver being engaged onto/into the lower part of the bore 6.

Figure 6:
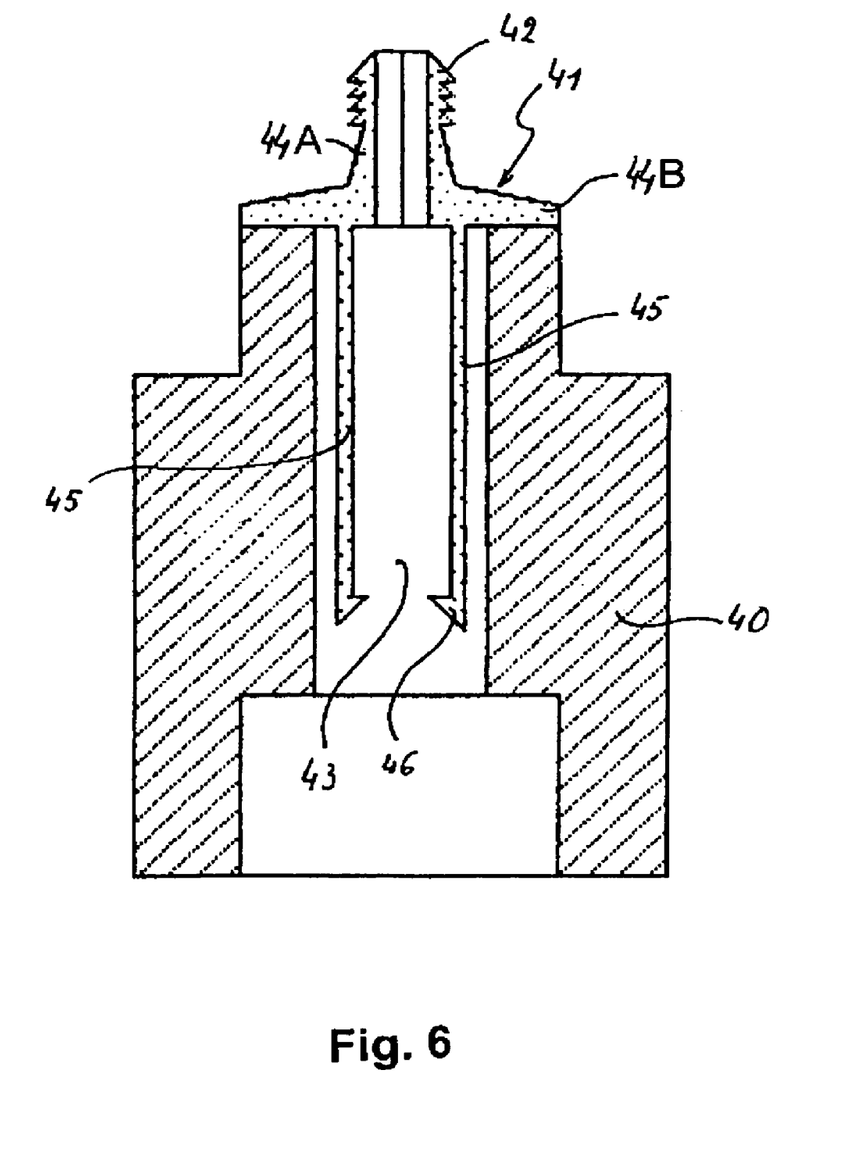
FIG. 6 is a side view, partially in section of a modified embodiment of a connecting element according to the invention.

FIG. 6 shows a modified embodiment of a connecting element 41 according to the invention, with a construction part 40 which can essentially be equal to the construction parts 20 and 21 shown in FIG. 5.

The connecting element 41 also comprises a male part 42 and a female part 43. The male part 42 comprises a bushing 44A provided with an external screw thread ending with a flange 44B having the same function as the flange 5 of the connecting element 1. On the other side of the flange 44B, two strips 45 extend, which are provided, near their free end, with an inwardly oriented edge 46 which, as shown in section in FIG. 6, has the shape of a saw tooth. The teeth 46 may be made as parts of a circle in order to fit better with the screw thread of the male part 42.

It is obvious that when pushing the strips 45 with a slight force elastically outside, the male part 42 can be pressed into the female part 43 like the connecting element 1 in FIG. 1. The number of strips 45 should not necessarily be limited to two, but can be any desired number.

Figure 7:
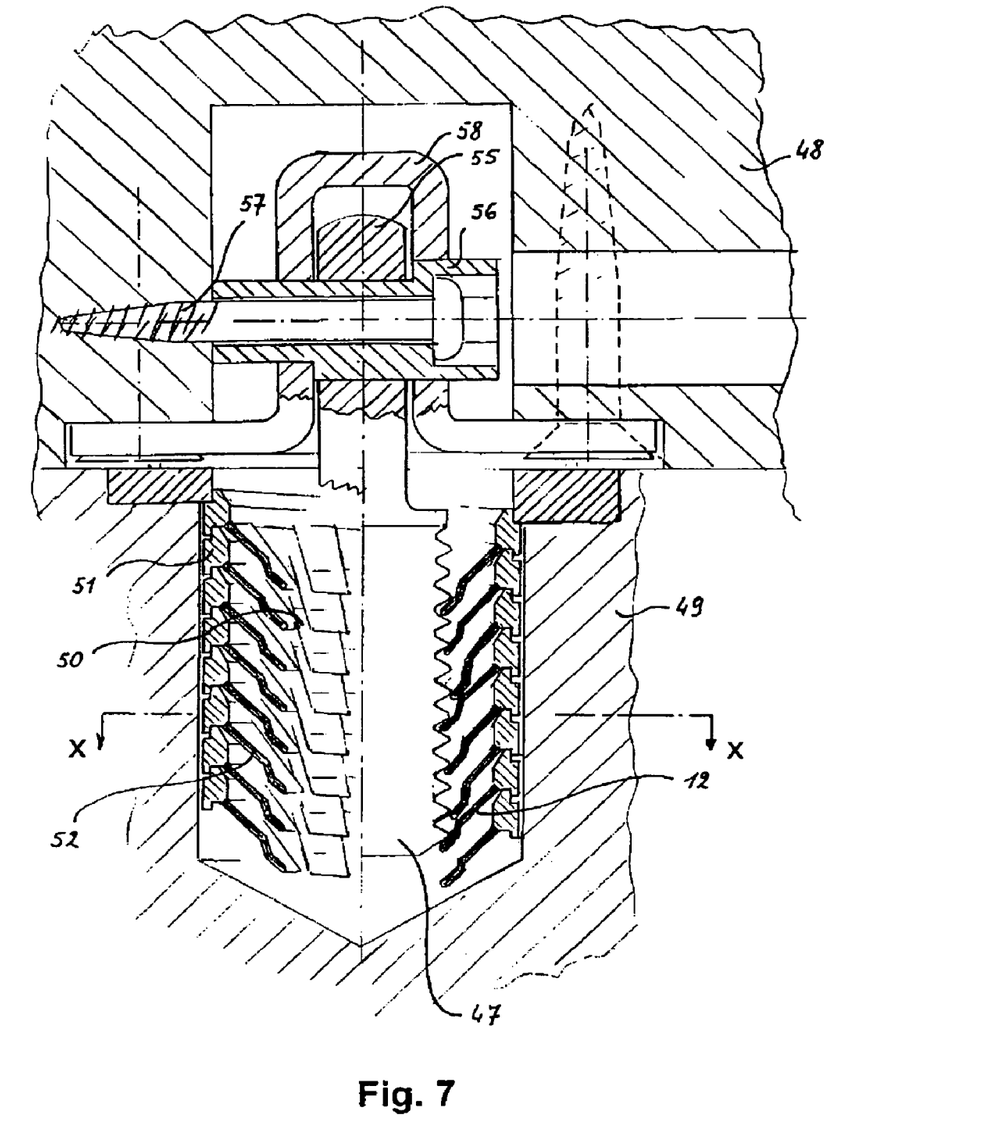
FIG. 7 is a side view, partially in section of a third modified embodiment of a connecting element according to the invention.
Figure 8:
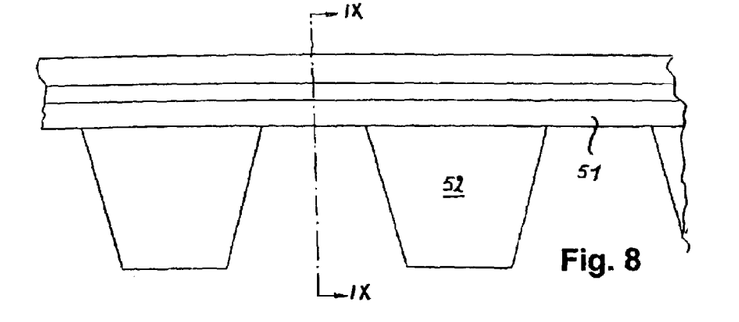
FIG. 8 is a top view showing some teeth of the connecting element according to FIG. 7.
Figure 9:
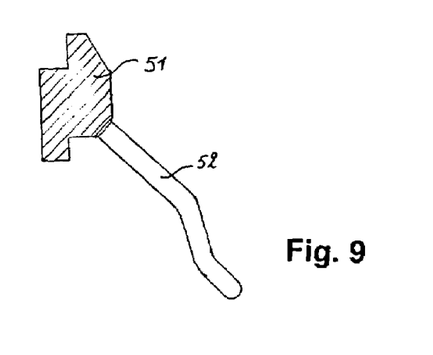
FIG. 9 is a section along line IX—IX in FIG. 8.

A modified embodiment of a connecting element according to the invention is shown in FIG. 7 wherein the male part can be a standard screw thread 47 in a connection comprising two elements 48 and 49, wherein the female part 50 is housed in the element 49. The female part 50 is made of a specially formed right strip 51 with, at regular distances, teeth 52 as globally shown in FIG. 8 with a section along IX—IX as shown in FIG. 9.

Figure 10:
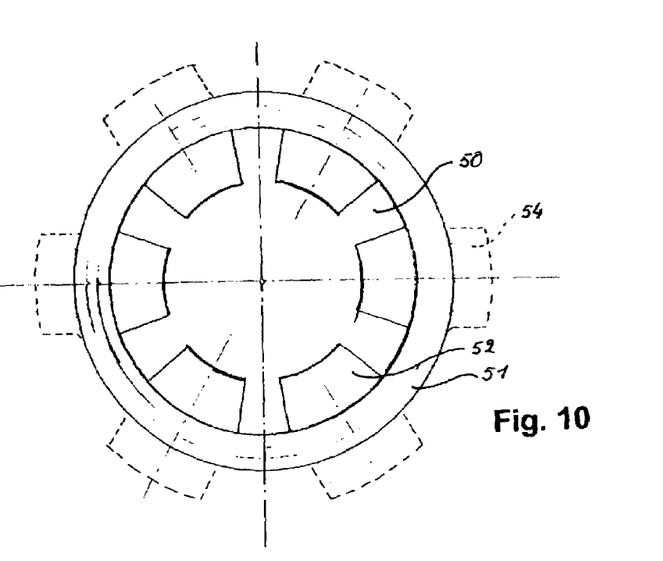
FIG. 10 is a section along line X—X in FIG. 7.

When spirally winding this strip 51 as a screw and optionally linking it, for example, with glue, the female part 50 in FIG. 7 is created in which the teeth may be engaged into the screw thread of bolt 47 according to the description of FIGS. 1 and 4. Therefore, when the elements 48 and 49 are loaded, each tooth 52 engaged with the screw thread of the bolt 47 is prone to bending out, but is supported by its immediately adjacent tooth 52, which is not engaged with the screw thread of the bolt 47 as shown in FIG. 7. The section of the spiral-shaped female part 50 is illustrated in FIG. 10, which is a view taken along X—X in FIG. 7. The strip 51 can also be provided opposite the teeth 52 with a screw thread shaped tooth (not shown) so that the female part can be screwed in a bore with a corresponding screw thread. Instead of a single tooth, multiple individual teeth 54 may also be provided which are shown in dashes in FIG. 10, and which can be fixed in a bore, provided or not with grooves. The screw thread 47 may be a part of a screw bolt to-connect two elements, but may also be some sort of an eye bolt in which an eccentric 56 is inserted through the eye 55, which eccentric is rotatable in a yoke 58 and can be locked with a screw 57 so that, when rotating the eccentric 56 with a box spanner, the connection between the elements 48 and 49 may be secured after the eye bolt has been stuck into the female part 50 and thereby creates an "out of sight" connection.

Figure 11:
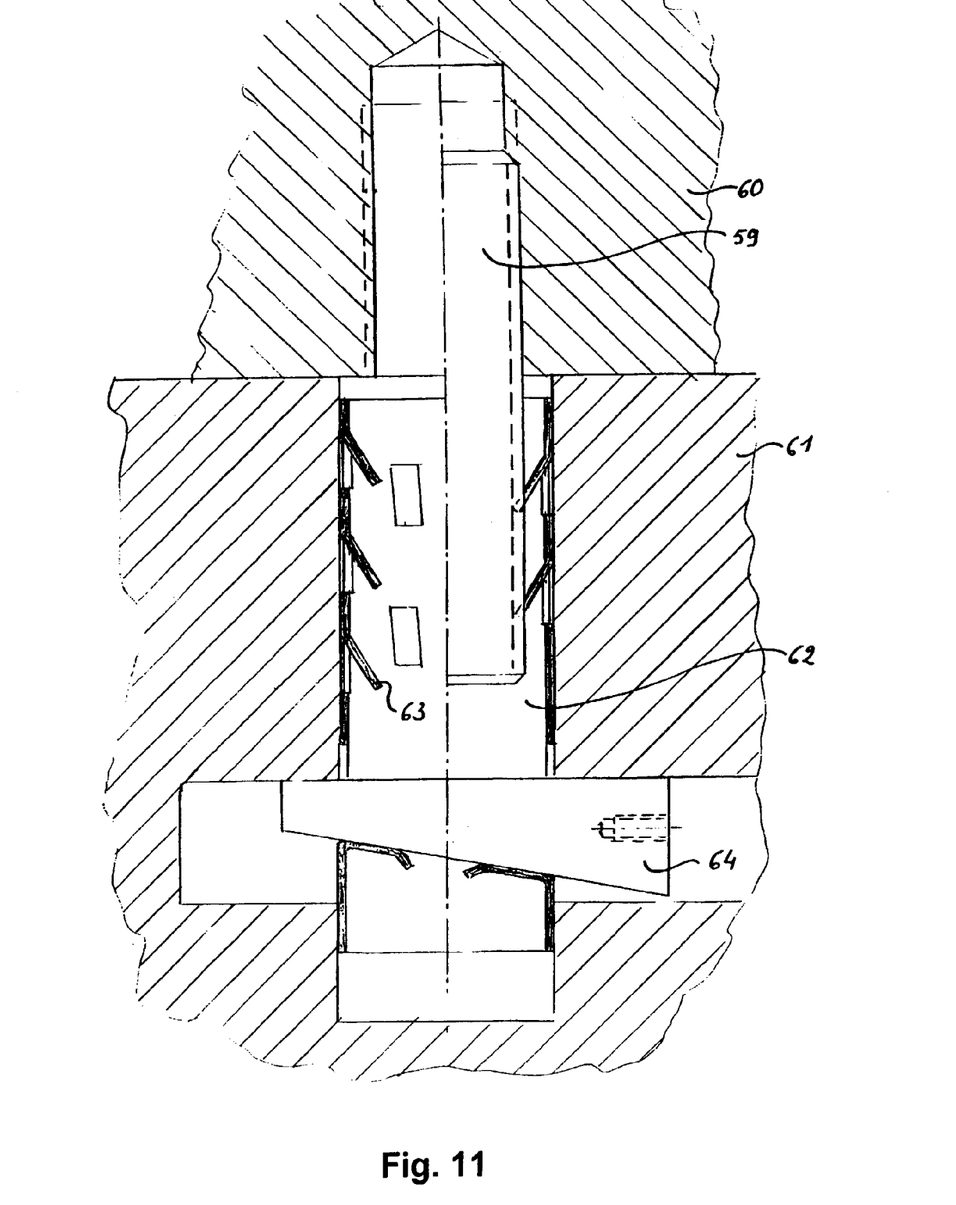
FIG. 11 is a diagrammatic illustration, partially in section of a fourth embodiment of the invention.

FIG. 11 shows an alternative for an "out of sight" connection, wherein a thread end 59 is rotated into an element 60 and, when connecting with an element 61, pressed into a female part 62 shown as comprising an elastic metal bushing with inserted teeth 63 which are able to grab into the screw thread of the thread end 59. As shown in FIG. 11, the female part 62 can be secured to the element 61 by inserting a key 64 into the female part 62 through a keyway in the element 61.

What is claimed is:

1. A locking device comprising:
    a first part including a bore having a plurality of teeth spaced axially in levels spaced along the bore in an axial direction thereof, each of the teeth being inwardly inclined and terminating at a free end that defines an inner diameter of the first part, a first of the teeth in a first of the levels and a second of the teeth in a second of the levels adjacent the first level being spaced apart a distance in the axial direction of the bore; and
    a second part having an externally threaded shaft receivable in the bore of the first part, the second part including a continuous helical rib defining an outer diameter of the threaded shaft, the helical rib defining a continuous helical groove having a pitch along an axial direction of the threaded shaft, the pitch of the helical groove being different than the distance between the first and second teeth of the first part;

wherein the inner diameter of the first part is smaller than the outer diameter of the threaded shaft and the threaded shaft is insertable into the bore by axial movement of the first part relative to the second part, such that when the threaded shaft of the second part is received in the bore of the first part, the free end of the first tooth is received in engagement with the helical groove, while the second tooth is not received in engagement with the helical groove but instead is deflected outwardly by the helical rib into engagement with the first tooth as a result of the pitch of the helical groove being different than the distance between the first and second teeth; and wherein the first part comprises a spiral-shaped strip that defines the bore, and the teeth extend into the bore from the spiral-shaped strip.

* * * * *